April 6, 1954     D. B. GARDINER     2,674,092
POWER TRANSMISSION
Filed Sept. 4, 1952
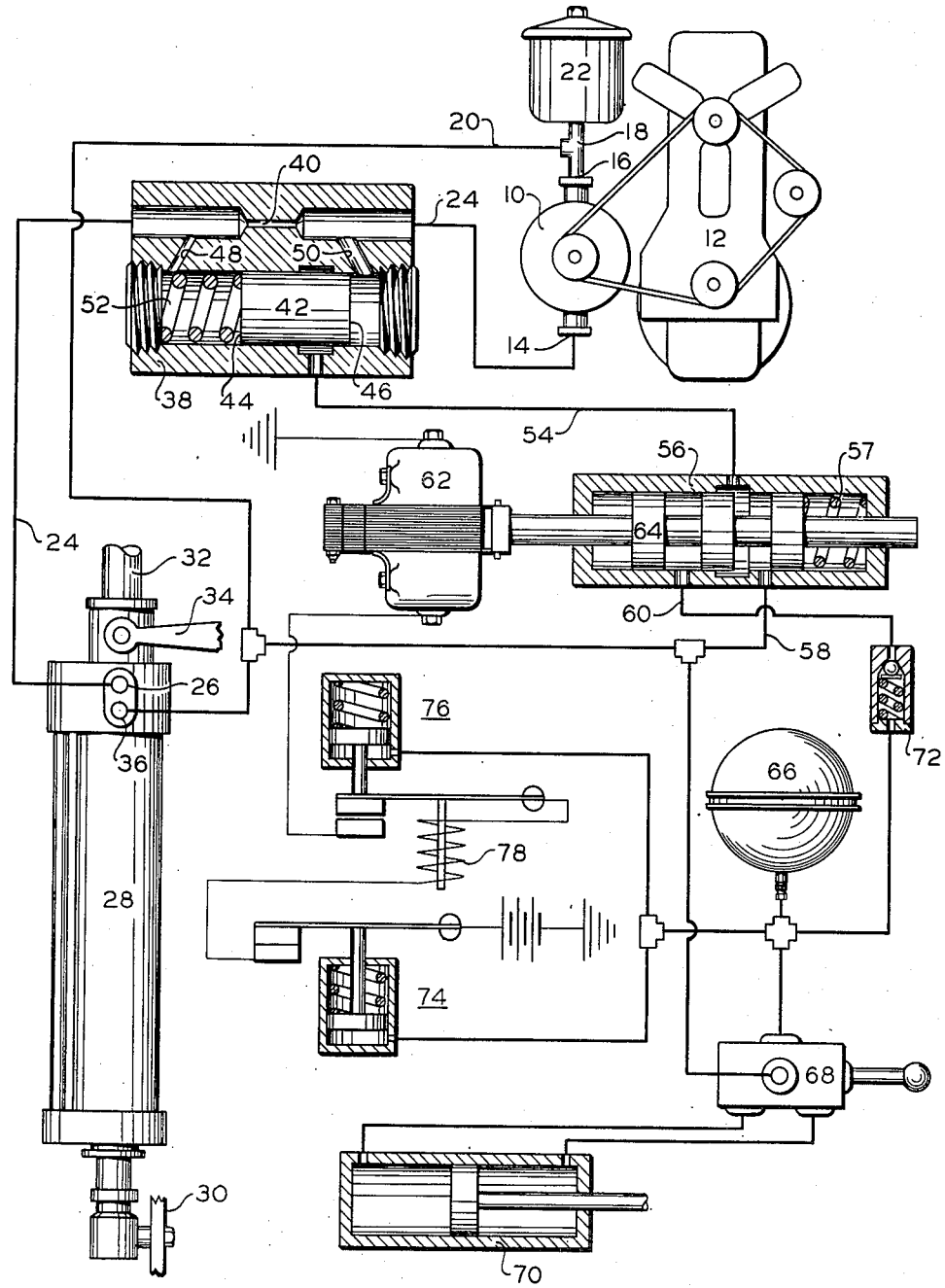
*INVENTOR.*
DUNCAN B. GARDINER
BY
ATTORNEY Patented Apr. 6, 1954

2,674,092

UNITED STATES PATENT OFFICE 2,674,092

POWER TRANSMISSION

Duncan B. Gardiner, Detroit, Mich., assignor to Vickers Incorporated, Detroit, Mich., a corporation of Michigan Application September 4, 1952, Serial No. 307,892

10 Claims. (Cl. 60—51)

This invention relates to power transmissions, and is particularly applicable to those of the type comprising two or more fluid pressure energy translating devices, one of which may function as a pump and another as a fluid motor.

More particularly, the invention relates to such a power transmission especially well adapted for hydraulic operation of motor vehicle accessories.

When regarded as a prime mover for accessory drives, the engine of a motor vehicle leaves much to be desired since its operating speed may vary from perhaps 400 R. P. M. to 4000 R. P. M. The output of, for example, a fixed displacement pump driven thereby will vary in the same ratio. This problem is further complicated by the fact that certain accessories, such as a steering booster, may require very substantial amounts of fluid while the engine is idling. The result is a large oversupply at intermediate and high speeds which is often highly undesirable. For example, the control valve used in many steering boosters is an open center type in which machining tolerances are very closely controlled. Valve land widths may be held to axial thickness tolerances of the order of one-thousandth of an inch. Such painstaking and expensive construction is utilized to give the vehicle operator a nicety and preciseness of feel which would be largely lost if the oil flow through the valve were allowed a large variance. Use of a variable displacement pump is a possible solution but the high cost and complexity of such pumps is prohibitive. For the above reasons, so called "flow control" valves have been widely used in conjunction with fixed displacement pumps for such applications.

Hydraulic power is also ideally suited for use in driving accessories other than power steering, for example, window lifts, windshield wipers, tops for convertibles, and seat position adjusters. It is, of course, desirable costwise that a single source of fluid pressure, such as the steering booster pump, be utilized to operate all the accessories on a particular vehicle. However, it is important to the safety of the vehicle that operation of these other accessories does not in any way affect operation of the steering booster. A flow proportioning device is not a satisfactory solution since at low speed it may be necessary to secure for the steering booster priority on the entire pump output.

It is also desirable that, even though the steering booster might at a particular moment be taking the entire pump output, a supply of pressure fluid be available for at least limited operation of other accessories.

Such a system should also relieve the load on the pump during those times when pressure fluid is not required either by the steering booster or the other accessories.

It is an object of the present invention to provide an improved, low cost, hydraulic power transmission system for operating a plurality of fluid motors from a single pump.

It is a further object to provide such a transmission which is particularly well adapted for use with a variable speed prime mover such as the engine of a motor vehicle.

Another object is to provide such a transmission which will insure that a particular primary motor, for example a steering motor, has priority over a secondary motor, or motors, on the entire pump output up to a predetermined rate.

It is also an object to provide such a transmission which has instantly available a supply of pressure fluid for operation of a secondary motor even though the primary motor may be utilizing the entire pump output.

Still another object is to provide such a system wherein the pump is unloaded during periods of no power demand by either the primary or secondary motors.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

The transmission includes a fixed displacement rotary pump 10, which may be of any suitable type, belt driven from the engine 12 of a motor vehicle. It can be seen that the speed, and hence the delivery rate, of pump 10 will vary in direct proportion with the speed of engine 12. Pump 10 has an outlet port indicated at 14 and an inlet port at 16. A T fitting 18 provides for connection at port 16 of a fluid return conduit 20 and a reservoir 22. It will be understood that return conduit 20 could, if desired, be connected directly to the reservoir 22 instead of T 18 and thus make reservoir 22 part of the return path to the pump inlet. A delivery conduit 24 is connected to outlet port 14.

Delivery conduit 24 extends from pump 10 to the inlet port 26 of a steering booster 28. Booster 28 may be of the type described in the patent to Vickers, 2,022,698, and is fixed to the frame of the motor vehicle at 30, connected to the vehicle steering linkage by a rod 32 and controlled by a pitman arm 34. Booster outlet port 36 is connected to the return conduit 20.

The importance of maintaining a relatively constant flow of fluid to the booster unit 28 has been heretofore pointed out. To this end a spillover type flow control valve 38 is interposed in the delivery line 24. An orifice or throat 40 serves as a metering device which, in cooperation with a valve spool 42, acts to sense and compensate changes in delivery rate. Spool 42 has a pair of opposed substantially equal areas 44 and 46 which are, through passages 48 and 50, subjected respectively to the pressure downstream and upstream from the orifice 40. A spring 52 resiliently biases spool 42 to the closed position illustrated in which passage 50 and hence delivery conduit 24 are isolated from a spillover conduit 54. As the pump delivery volume increases, a point will be reached at which the pressure differential across orifice 40, and consequently on opposed areas 44 and 46, will cause valve 42 to move to the left and start to divert fluid from conduit 24 through passage 50 and to the conduit 54. As the pump delivery volume increases beyond such point, the valve will open wider thus bypassing the excess delivery. At all speeds above the cracking point, valve 38 will tend to maintain the pressure drop through the orifice 40 constant and thus maintain the flow rate therethrough constant. It can be seen that at all speeds below the cracking point of valve 38, the entire output of pump 10 will flow through orifice 40 to booster 28.

Spillover conduit 54 leads to a spring biased directional valve 56. Valve 56 is biased by spring 57 to the position illustrated, in which it affords communication between conduit 54 and a return conduit 58 and isolates conduit 54 from another conduit 60. A push type solenoid 62 is so positioned with respect to valve 56 that, upon energization, it will contact spool 64, shifting it rightwardly against spring 57 to effect communication between conduits 54 and 60 while isolating conduits 54 and 58.

Conduit 60 is connected in parallel to an accumulator 66 and the control valve 68 for a fluid motor 70. Valve 68 and motor 70 are intended to be representative of various fluid motors and their controls which might be utilized for operation of vehicle accessories such as those heretofore mentioned. A check valve 72 in conduit 60 is so oriented as to permit free flow from valve 56 to the accumulator 66 and motor 70 and to block reversal of such flow.

Operation of solenoid 62 is controlled by a pair of pressure switches indicated at 74 and 76. Switches 74 and 76 are responsive to pressure in the accumulator 66, as shown. Switch 74 might, for example, be set to open at a pressure of 1000 p. s. i. Switch 76 could then be set to close at a pressure of perhaps 800 p. s. i. The winding 78 is arranged so that once switch 76 is closed by a pressure drop to the 800 p. s. i. setting, it is retained in the closed position until the circuit is broken by the opening of switch 74. Thus once accumulator 66 has been fully charged to the 1000 p. s. i. setting the pressure must drop to the 800 p. s. i. figure before solenoid 62 will be energized. As heretofore described, valve 56 normally maintains conduit 54 in communication with return conduit 58 and, upon energization of solenoid 62, is effective to connect conduit 54 to conduit 60 leading to accumulator 66.

In operation, with engine 12 driving pump 10 at slow speed, the entire output of the pump will flow to the steering booster 28 since valve 38 will remain closed. Booster 28 is thus assured priority on the pump output up to the point where valve 38 starts to crack. During such low speed operation, motor 70 may be operated by high pressure fluid stored in the accumulator 66 without affecting the action of the steering booster. As the speed of engine 12 is increased, valve 38 will divert an increasing amount of the fluid being pumped into spillover conduit 54. When accumulater 66 is fully charged the diverted flow is ported to the return line 58 by valve 56, thus unloading the pump 10 to whatever pressure is demanded by booster unit 28. If accumulator 66 is not fully charged, flow in conduit 60 will be directed thereto by valve 56 upon energization of solenoid 62 by pressure switches 74 and 76. When the accumulator 66 has been recharged solenoid 62 will be deenergized and valve 56 will again divert the spilled over fluid to return passage 58.

There has thus been provided a transmission system for operation of a plurality of fluid motors supplied with fluid from a single pump driven at variable speeds. By providing a branch circuit equipped with an accumulator and supplied with fluid diverted by a flow control valve, one motor has been assured priority over another although both may be operated concurrently. Provisions for unloading the pump insure maximum operating efficiency.

While the form of embodiment of the invention as herein disclosed constitutes a preferred form, it is to be understood that other forms might be adopted, all coming within the scope of the claims which follow.

What is claimed is as follows:

1. In a hydraulic power transmission system, the combination of: a pump unit having an inlet and an outlet; first and second fluid motor units each having an inlet; first fluid conduit means interconnecting the outlet of the pump with the inlet of the first motor; valve means responsive to the rate of fluid flow in said first conduit means to divert fluid therefrom; second conduit means leading from the valve means to carry the diverted flow; third conduit means leading to the pump inlet; fourth conduit means leading to the inlet of said second fluid motor; and valve means selectively operable to effect communication between said second conduit means and either said third or said fourth conduit means.

2. In a hydraulic power transmission system, the combination of: a pump unit having an inlet and an outlet; first and second fluid motor units each having an inlet; first fluid conduit means interconnecting the outlet of the pump with the inlet of the first motor; valve means responsive to the rate of fluid flow in said first conduit means to divert fluid therefrom; second conduit means leading from the valve means to carry the diverted flow; third conduit means leading to the pump inlet; fourth conduit means leading to the inlet of said second fluid motor; and second valve means resiliently biased toward a position in which it effects fluid communication between said second and third conduits, said second valve means being selectively shiftable to effect communication between said second and fourth conduits.

3. In a hydraulic power transmission system, the combination of: a pump unit having an inlet and an outlet, first and second fluid motor units each having an inlet; first fluid conduit means interconnecting the outlet of the pump with the inlet of the first motor; valve means responsive to the rate of fluid flow in said first conduit means to divert fluid therefrom; second conduit means leading from the valve means to carry the diverted flow; third conduit means leading to the pump inlet; fourth conduit means leading to the inlet of said second fluid motor; and second valve means resiliently biased toward a position in which it effects fluid communication between said second and third conduits, said second valve means being selectively shiftable in response to pressure drop in the fourth conduit to effect communication between said second and fourth conduits.

4. In a hydraulic power transmission system, the combination of: a pump unit having an inlet and an outlet; first and second fluid motor units each having an inlet; an accumulator in fluid communication with the inlet of said second fluid motor; fluid conduit means interconnecting the outlet of the pump with the inlet of the first motor; valve means responsive to the rate of fluid flow in said conduit means to divert fluid therefrom; second conduit means to carry the diverted fluid, interconnecting said valve and the inlet of said second fluid motor; and valve means in said second conduit means to divert fluid therefrom when said accumulator is charged.

5. In a hydraulic power transmission system, the combination of: a pump unit having an inlet and an outlet, first and second fluid motor units each having an inlet; first fluid conduit means interconnecting the outlet of the pump with the inlet of the first motor; valve means responsive to the rate of fluid flow in said first conduit means to divert fluid therefrom; second conduit means leading from the valve means to carry the diverted flow; third conduit means leading to the pump inlet; fourth conduit means leading to the inlet of said second fluid motor; valve means resiliently biased toward a position in which it effects fluid communication between said second and third conduits, said valve means being selectively shiftable in response to demand by said motor to effect communication between said second and fourth conduits; and check valve means in said last mentioned conduit means so oriented as to allow free flow from said valve.

6. In a hydraulic power transmission system, the combination of: a pump unit having an inlet and an outlet; first and second fluid motors each having an inlet; first fluid conduit means interconnecting the outlet of the pump with the inlet of the first motor; valve means responsive to the rate of fluid flow in said first conduit means to divert fluid therefrom; second fluid conduit means leading from the valve means to carry the diverted flow; third fluid conduit means leading to the pump inlet; fourth fluid conduit means leading to the inlet of said second fluid motor; an accumulator in fluid communication with the inlet of said second fluid motor; and valve means selectively operable to effect communication between said second conduit means and either said third or said fourth conduit means.

7. In a hydraulic power transmission system, the combination of: a pump unit having an inlet and an outlet; first and second fluid motors each having an inlet; first fluid conduit means interconnecting the outlet of the pump with the inlet of the first motor; valve means responsive to the rate of fluid flow in said first conduit means to divert fluid therefrom; second fluid conduit means leading from the valve means to carry the diverted flow; third fluid conduit means leading to the pump inlet; fourth fluid conduit means leading to the inlet of said second fluid motor; check valve means in said fourth conduit so oriented as to allow free flow to said second motor; an accumulator in fluid communication with the inlet of said second fluid motor; and valve means selectively operable to effect communication between said second conduit means and either said third or said fourth conduit means.

8. In a hydraulic power transmission system, the combination of: a pump unit having an inlet and an outlet; first and second fluid motors each having an inlet; first fluid conduit means interconnecting the outlet of the pump with the inlet of the first motor; valve means responsive to the rate of fluid flow in said first conduit means to divert fluid therefrom; second fluid conduit means leading from the valve means to carry the diverted flow; third fluid conduit means leading to the pump inlet; fourth fluid conduit means leading to the inlet of said second fluid motor; an accumulator in fluid communication with the inlet of said second fluid motor; and valve means operable in response to a predetermined minimum pressure in said accumulator to effect communication between said second conduit means and said fourth conduit means.

9. In a hydraulic power transmission system, the combination of: a pump unit having an inlet and outlet; a prime mover in a driving relation with the pump unit, said prime mover being of the type having a substantial speed variation during operation; first and second fluid motor units each having an inlet; fluid conduit means interconnecting the outlet of the pump and the inlet of the first motor; valve means responsive to a predetermined rate of flow in said conduit means to divert fluid therefrom; and conduit means to carry the diverted fluid, interconnecting said valve means and the inlet of said second fluid motor, whereby the first motor is assured of priority over the second motor at all flow rates below said predetermined rate.

10. In a hydraulic power transmission system, the combination of: a pump unit having an inlet and outlet; a prime mover in a driving relation with the pump unit, said prime mover being of the type having a substantial speed variation during operation; a first fluid motor of the follow-up servo type requiring a continuous supply of pressure fluid and having an inlet; a second fluid motor having intermittent pressure fluid requirements and having an inlet; fluid conduit means interconnecting the outlet of the pump and the inlet of the first motor; valve means responsive to a predetermined rate of flow in said conduit means to divert fluid therefrom; and conduit means to carry the diverted fluid, interconnecting said valve means and the inlet of said second fluid motor, whereby the first motor is assured of priority over the second motor at all flow rates below said predetermined rate.

References Cited in the file of this patent

UNITED STATES PATENTS

| Number | Name | Date |
| --- | --- | --- |
| 2,112,466 | Maloon | Mar. 29, 1938 |
| 2,301,028 | Esch | Nov. 3, 1942 |
| 2,354,634 | Griswold | July 25, 1944 |
| 2,398,265 | Tyler | Apr. 9, 1946 |